United States Patent
Kasagi (10) Patent No.: US 10,306,493 B2
(45) Date of Patent: May 28, 2019

(54) MEASUREMENT DEVICE AND MEASUREMENT METHOD

(71) Applicant: ANRITSU CORPORATION, Kanagawa (JP)

(72) Inventor: Takahiro Kasagi, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 80 days.

(21) Appl. No.: 15/803,997

(22) Filed: Nov. 6, 2017

(65) Prior Publication Data
US 2018/0255471 A1    Sep. 6, 2018

(30) Foreign Application Priority Data
Mar. 6, 2017  (JP) .................................. 2017-041894

(51) Int. Cl.
| | |
|---|---|
| H04W 24/06 | (2009.01) |
| H04W 24/10 | (2009.01) |
| H04B 17/23 | (2015.01) |
| H04B 17/29 | (2015.01) |
| H04B 17/16 | (2015.01) |

(52) U.S. Cl.
CPC ............ H04W 24/06 (2013.01); H04B 17/23 (2015.01); H04W 24/10 (2013.01); *H04B 17/16* (2015.01); *H04B 17/29* (2015.01)

(58) Field of Classification Search
CPC ..... H04W 88/02; H04W 88/06; H04W 88/08; H04W 24/06; H04W 24/08
See application file for complete search history.

(56) References Cited

U.S. PATENT DOCUMENTS

| | | | | |
|---|---|---|---|---|
| 9,743,297 | B1* | 8/2017 | Jackson | ............ H04B 17/3912 |
| 2003/0048837 | A1* | 3/2003 | Sakai | .................. H04B 3/46 |
| | | | | 375/224 |
| 2010/0197299 | A1* | 8/2010 | Huber | ................... H04W 24/06 |
| | | | | 455/425 |
| 2013/0072126 | A1* | 3/2013 | Topaltzas | ............... H04W 24/08 |
| | | | | 455/67.11 |
| 2014/0250328 | A1* | 9/2014 | Schnizler | ............ G06F 11/2733 |
| | | | | 714/31 |

(Continued)

FOREIGN PATENT DOCUMENTS

| | | | |
|---|---|---|---|
| JP | 2014-504053 A | 2/2014 | |
| WO | WO-2016138550 A1 * | 9/2016 | ........ H04W 36/0085 |

*Primary Examiner* — Robert M Morlan
(74) *Attorney, Agent, or Firm* — Pearne & Gordon LLP (57) ABSTRACT

A measurement device includes a capability information acquisition unit that acquires capability information indicating capability of a DUT set for each item determined in advance, a setting unit that sets a measurement condition of the DUT, a measurement unit that performs measurement of the DUT on the basis of the measurement condition, a capability determination unit that notifies of capability excess information indicating that the measurement condition regarding a certain item among the measurement conditions exceeds capability determined for each item in advance on condition that the measurement condition regarding the item among the measurement conditions has been set to exceed the capability determined for each item in advance, and a display unit that displays capability excess information.

8 Claims, 8 Drawing Sheets

(56) References Cited

U.S. PATENT DOCUMENTS

2014/0355457 A1* 12/2014 Huang .................. H04W 24/10
                                                  370/252
2015/0036729 A1*  2/2015 Olgaard ................ H04B 17/29
                                                  375/224
2016/0356670 A1* 12/2016 Brillhart ............ G01M 11/3136
2018/0102860 A1*  4/2018 Emmanuel ............ H04W 28/04
2018/0159894 A1*  6/2018 Reddy ................ H04L 63/1458
2018/0338187 A1* 11/2018 Ketonen .......... H04N 21/64738

* cited by examiner

| LDPC Coding Capability | 0 : not supported |
|---|---|
| Supported Channel Width Set | 0 : only 20 MHz operation is supported |
| SM Power Save | 3 : SM power save disabled or not supported |
| HT-Greenfield | 0 : not supported |
| Short GI for 20 MHz | 1 : supported |
| Short GI for 40 MHz | 0 : not supported |
| Tx STBC | 0 : not supported |
| Rx STBC | 0 : not supported |
| HT-delayed Block Ack | 0 : not supported |
| Maximum A-MSDU Length | 1 : 7935 octets |
| DSSS/CCK Mode in 40 MHz | 0 : STA does not use DSSS/CCK in 40 MHz |
| Reserved | 0 : reserved |
| Forty MHz Intolerant | 0 : not prohibit 40 MHz transmissions |
| L-SIG TXOP Protection Support | 0 : not supported |

| | |
|---|---|
| LDPC Coding Capability | 0 : not supported |
| Supported Channel Width Set | 0 : only 20 MHz operation is supported |
| SM Power Save | 3 : SM power save disabled or not supported |
| HT-Greenfield | 0 : not supported |
| Short GI for 20 MHz | 1 : supported |
| Short GI for 40 MHz | 0 : not supported |
| Tx STBC | 0 : not supported |
| Rx STBC | 0 : not supported |
| HT-delayed Block Ack | 0 : not supported |
| Maximum A-MSDU Length | 1 : 7935 octets |
| DSSS/CCK Mode in 40 MHz | 0 : STA does not use DSSS/CCK in 40 MHz |
| Reserved | 0 : reserved |
| Forty MHz Intolerant | 0 : not prohibit 40 MHz transmissions |
| L-SIG TXOP Protection Support | 0 : not supported |

MEASUREMENT DEVICE AND MEASUREMENT METHOD

TECHNICAL FIELD

The present invention relates to a measurement device and a measurement method of measuring a device under test using, for example, a wireless communication technology.

BACKGROUND ART

In the related art, as such a type of measurement device, a test system that tests a wireless data packet transceiver as a device under test is known (see, for example, Patent Document 1).

The device of the related art described in Patent Document 1 includes a transmitter, a receiver, and a controller/processor, and tests a device under test (DUT).

The controller/processor can suppress transmission for returning an acknowledge signal until a predetermined number of valid data packets are received from the DUT, until a predetermined time interval has elapsed, or until a predetermined number of valid data packets at a data transfer rate are received from the DUT by controlling the transmitter and the receiver.

With this configuration, the device in the related art can reduce time required to perform a test without deleting necessary steps or without impairing integrity of the test.

RELATED ART DOCUMENT

[Patent Document]
[Patent Document 1] JP-T-2014-504053

DISCLOSURE OF THE INVENTION

Problem that the Invention is to Solve

Incidentally, in measurement in which a wireless communication technology is used, it is necessary to set measurement conditions suitable for a predetermined wireless communication standard, as in the device of the related art. However, when a setting of the measurement conditions is inappropriate, a problem arises in that a communication error is generated at the time of communication with a device under test or an expected measurement result is not obtained. Further, when this type of problem arises, causes thereof cannot be easily recognized by a user in many cases.

The present invention has been made in view of the circumstances as described above, and an object of the present invention is to provide a measurement device and a measurement method capable of notifying a user of an inappropriate setting of measurement conditions in a case where a setting of the measurement conditions is inappropriate.

Means for Solving the Problem

A measurement device according to claim 1 of the present invention is configured to include capability information acquisition means (13) for acquiring capability information indicating capability of a device under test (1) set for each item determined in advance; measurement condition setting means (16) for setting a measurement condition of the device under test, measurement means (12) for performing measurement of the device under test on the basis of the measurement condition; and capability excess information notification means (17) for notifying of capability excess information indicating that the measurement condition regarding the item among the measurement conditions exceeds capability determined for each item in advance on condition that the measurement condition regarding the item among the measurement conditions has been set to exceed the capability determined for each item in advance.

With this configuration, in the measurement device according to claim 1 of the present invention, since the capability excess information notification means notifies of capability excess information indicating that the measurement condition regarding a certain item among the measurement conditions exceeds capability determined for each item in advance on condition that the measurement condition regarding the item among the measurement conditions has been set to exceed the capability determined for each item in advance, it is possible to notify the user of an inappropriate setting of the measurement conditions in a case where the setting of the measurement conditions is inappropriate.

The measurement device according to claim 2 of the present invention further includes display control means (18) for performing control to display at least one of the measurement condition and the measurement result of the device under test, and the capability information for each item side by side on a predetermined display device (19), wherein the display control means highlights and displays at least one of the item and the capability information on condition that the capability excess information has been notified from the capability excess information notification means.

With this configuration, in the measurement device according to claim 2 of the present invention, since the measurement condition or the measurement result of the device under test and the highlighted and displayed inappropriate measurement condition are displayed side by side on the display device, it is possible to reliably notify the user of an inappropriate setting of the measurement conditions in a case where the setting of the measurement conditions is inappropriate.

The measurement device according to claim 3 of the present invention further includes wireless communication connection establishment means (11) for establishing wireless communication connection with the device under test, wherein the capability information acquisition means is configured to acquire the capability information for each item in a process of establishing the wireless communication connection.

With this configuration, the measurement device according to claim 3 of the present invention can acquire the capability information for each item in the process of establishing the wireless communication connection.

In the measurement device according to claim 4 of the present invention, the wireless communication connection establishment means establishes the wireless communication connection on the basis of a communication standard conforming to IEEE 802.11, and the capability information for each item is capability information that is defined in the communication standard.

With this configuration, the measurement device according to claim 4 of the present invention can acquire the capability information using the capability information of the communication standard conforming to IEEE 802.11.

A measurement method according to claim 5 of the present invention is configured to include a capability information acquisition step (S15) of acquiring capability information indicating capability of a device under test (1) set for each item determined in advance; a measurement condition setting step (S22) of setting a measurement condition of the device under test; a measurement step (S26) of performing measurement of the device under test on the basis of the measurement condition; and a capability excess information notification step (S24) of notifying of capability excess information indicating that the measurement condition regarding the item among the measurement conditions exceeds capability determined for each item in advance on condition that the measurement condition regarding the item among the measurement conditions has been set to exceed the capability determined for each item in advance.

With this configuration, in the measurement method according to claim 5 of the present invention, since a notification of the capability excess information indicating that the measurement condition regarding a certain item among the measurement conditions exceeds capability determined for each item in advance on condition that the measurement condition regarding the item among the measurement conditions has been set to exceed the capability determined for each item in advance is sent in the capability excess information notification step, it is possible to notify the user of an inappropriate setting of the measurement conditions in a case where the setting of the measurement conditions is inappropriate Advantage of the Invention According to the present invention, it is possible to provide a measurement device and a measurement method having an effect that it is possible to notify a user of an inappropriate setting of measurement conditions in a case where the setting of the measurement conditions is inappropriate.

BEST MODE FOR CARRYING OUT THE INVENTION

Hereinafter, embodiments of the present invention will be described with reference to the drawings.

First, a configuration of the measurement device 10 according to a first embodiment of the present invention will be described.

Figure 1:
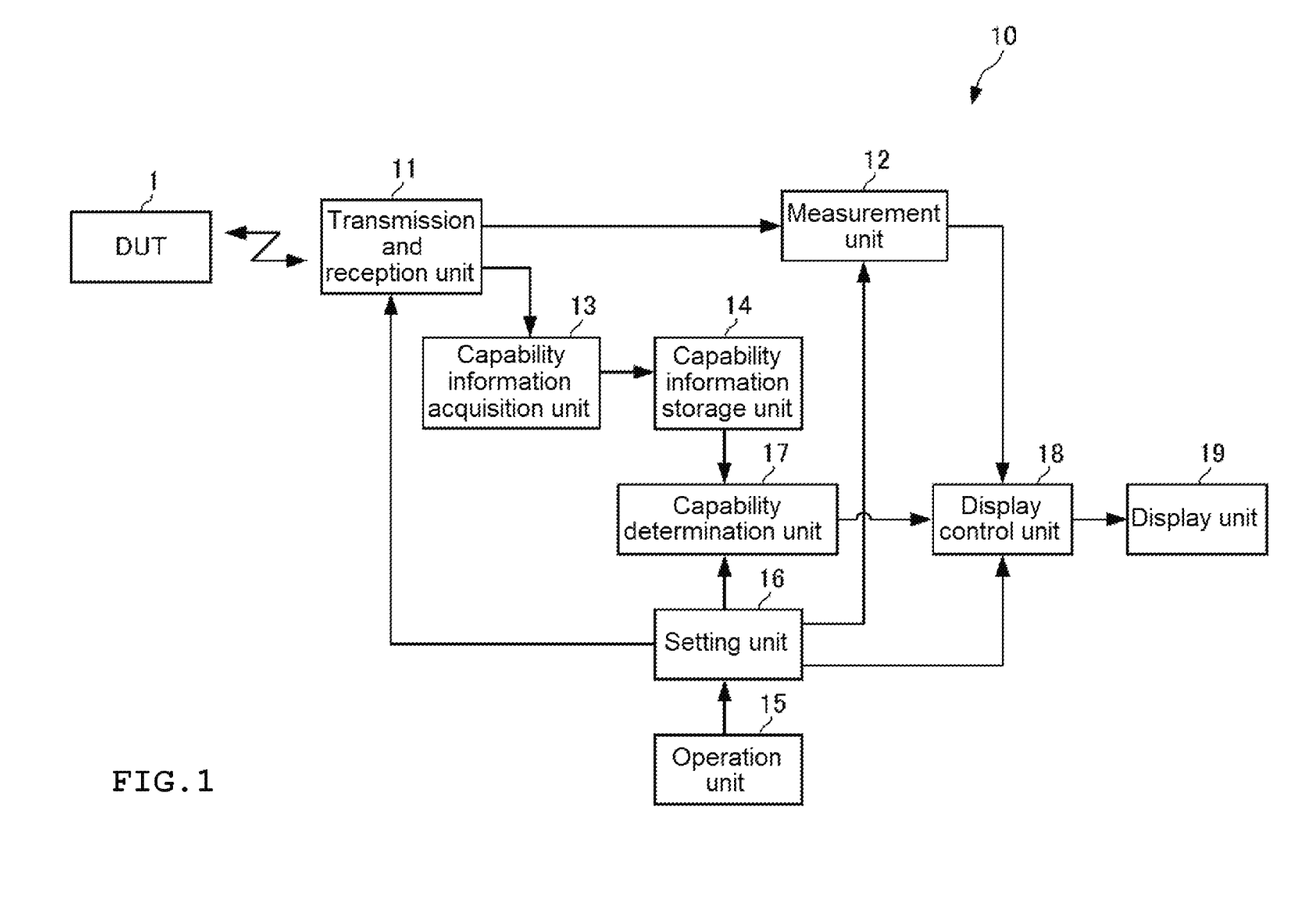
FIG. 1 is a block configuration diagram of a measurement device in an embodiment of the present invention.

As illustrated in FIG. 1, the measurement device 10 according to this embodiment performs wireless communication with a DUT 1 to measure the DUT 1. In this embodiment, it is assumed that the measurement device 10 operates as a wireless LAN parent device (AP: Access Point), and the DUT 1 operates as a wireless LAN child device (STA: STAtion). The DUT 1 is an example of a device under test.

The measurement device 10 includes a transmission and reception unit 11, a measurement unit 12, a capability information acquisition unit 13, a capability information storage unit 14, an operation unit 15, a setting unit 16, a capability determination unit 17, a display control unit 18, and a display unit 19. This measurement device 10 includes, for example, a microcomputer including a CPU, a ROM, a RAM, and an input and output circuit to which various interfaces are connected. The measurement device 10 causes the microcomputer to function as each functional unit of the measurement device 10 by executing a control program stored in the ROM in advance.

The transmission and reception unit 11 establishes a wireless communication connection with the DUT 1 on the basis of a predetermined wireless communication standard. In this embodiment, the transmission and reception unit 11, for example, is assumed to establish a wireless communication connection with the DUT 1 on the basis of a communication standard conforming to IEEE 802.11. This transmission and reception unit 11 is an example of wireless communication connection establishment means.

Further, the transmission and reception unit 11 transmits and receives various types of data regarding measurement to and from the DUT 1 after establishment of the wireless communication connection. For example, the transmission and reception unit 11 includes a signal generator that generates data with a predetermined signal pattern in order to perform reception measurement for evaluating reception performance of the DUT 1. The transmission and reception unit 11 packetizes data with a predetermined signal pattern, transmits the data to the DUT 1, and receives a response signal from the DUT 1 according to an instruction signal from the setting unit 16.

The measurement unit 12 receives data of the DUT 1 received by the transmission and reception unit 11, and performs measurement of the DUT 1 on the basis of measurement conditions from the setting unit 16. Data of a measurement result of the measurement unit 12 is output to the display control unit 18. Further, in a case where the measurement is not completed due to generation of an error in the wireless communication between the transmission and reception unit 11 and the DUT 1, the measurement unit 12, for example, notifies the display control unit 18 of the fact as the measurement result. The measurement unit 12 is an example of measurement means.

The capability information acquisition unit 13 acquires capability information indicating capability of the DUT 1 set for each item determined in advance. This capability information is, for example, capability information that is defined in a communication standard conforming to IEEE 802.11. The capability information acquisition unit 13 acquires the capability information when the transmission and reception unit 11 establishes the wireless communication connection with the DUT 1. The capability information acquisition unit 13 is an example of capability information acquisition means.

The capability information storage unit 14 stores the capability information acquired by the capability information acquisition unit 13.

A user operates the operation unit 15 in order to set measurement items, measurement conditions, determination conditions, and the like (these are collectively referred to as "measurement conditions and the like") for measurement of the DUT 1. The operation unit 15 includes, for example, an input device such as a keyboard, a dial, or a mouse, and a control circuit that controls these.

The setting unit 16 outputs information on the measurement conditions and the like input by the user operating the operation unit 15 to the transmission and reception unit 11, the capability determination unit 17, the measurement unit 12, and the display control unit 18. The setting unit 16 is an example of measurement condition setting means.

The capability determination unit 17 determines whether or not the measurement condition regarding an item of capability information among the measurement conditions has been set to exceed the capability for the item determined in advance on the basis of the capability information stored in the capability information storage unit 14 and the information on the measurement conditions input from the setting unit 16. The capability determination unit 17 is an example of capability excess information notification means.

Specifically, for example, in a case where no correspondence to a data format of a certain item is determined in advance, when a measurement condition using the data format is set, the capability determination unit 17 determines that the set measurement condition has been set to exceed the capability determined in advance, that is, determines that the set measurement condition is capability excess. In this case, the capability determination unit 17 outputs an indication that the set measurement condition exceeds the capability (hereinafter referred to as "capability excess information") to the display control unit 18, and the display control unit 18 displays the capability excess information on the display unit 19. Accordingly, it is possible to notify the user of the capability excess information.

The display control unit 18 receives information such as the measurement result from the measurement unit 12, a capability determination result from the capability determination unit 17, and the measurement condition from the setting unit 16, and executes display control to display the information on the display unit 19. This display control unit 18 is an example of display control means.

The display unit 19 displays the measurement conditions and the like, the measurement result, the capability determination result, and the like according to the display control of the display control unit 18. The display unit 19 is an example of a display device.

Figure 2:
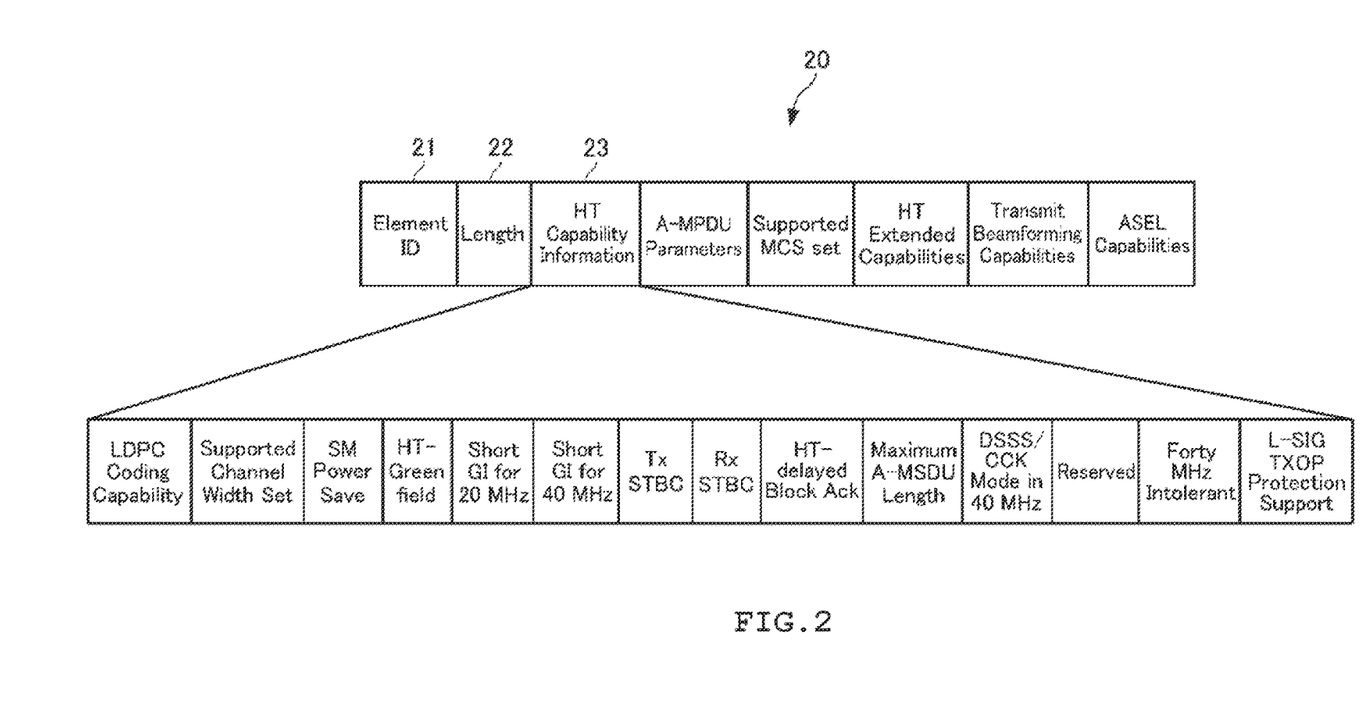
FIG. 2 is a diagram illustrating an example of a format of an information element that the measurement device in an embodiment of the present invention receives from a DUT.
Figure 3:
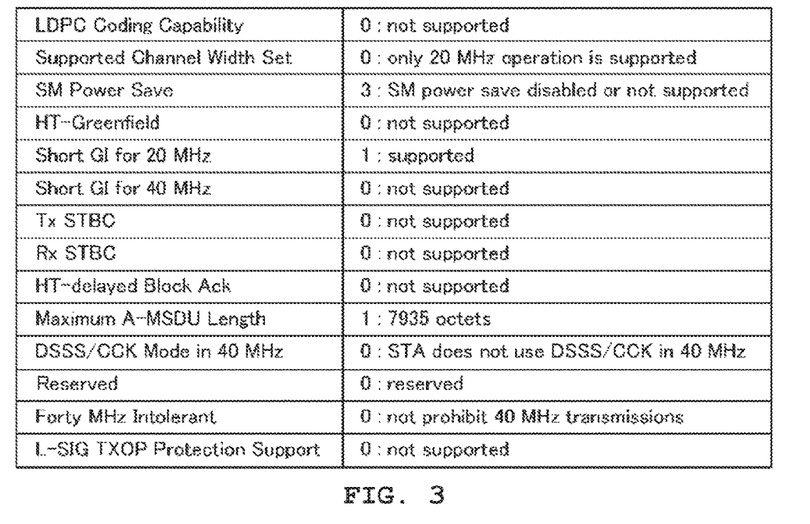
FIG. 3 is a diagram illustrating an example of capability information that the measurement device in an embodiment of the present invention receives from a DUT.

Next, the capability information acquired by the capability information acquisition unit 13 will be described with reference to FIGS. 2 and 3. FIG. 2 illustrates an example of a format of an information element that the transmission and reception unit 11 receives from the DUT 1. FIG. 3 is a diagram illustrating a setting example of the capability information.

The format of the information element illustrated in FIG. 2 includes an identifier information (Element ID) field 21 indicating a meaning of the information element, an information element length information (Length) field 22, and a capability information (HT Capability Information) field 23.

Among them, the capability information field 23 describes capability information indicating capability of the DUT 1 set for each of predetermined 14 items, as illustrated. Since each item of the capability information field 23 is described in a specification of IEEE 802.11, description thereof will be omitted. The capability information field 23 of the DUT 1 in this embodiment is assumed to be set as illustrated in FIG. 3.

In FIG. 3, for example, "0: not supported" (not available) or "1: supported" (available) (not illustrated) can be selected for an item "HT-Greenfield". In the DUT 1 of this embodiment, "0: not supported" is set and indicates that a high throughput green field mode (hereinafter abbreviated as an "HTGF mode") is not available for the DUT 1.

Further, for example, "0: 3839 octets" or "1: 7935 octets" (not illustrated) can be selected for a item "Maximum A-MSDU Length". In the DUT 1 of this embodiment, "1: 7935 octets" is set and indicates that a maximum length of an Aggregate MAC Service Data Unit (A-MSDU) allowable in communication with the DUT 1 is 7935 octets.

Next, an example of the information displayed on the display unit 19 according to the display control of the display control unit 18 will be described with reference to FIGS. 4A and 4B.

Figure 4A:
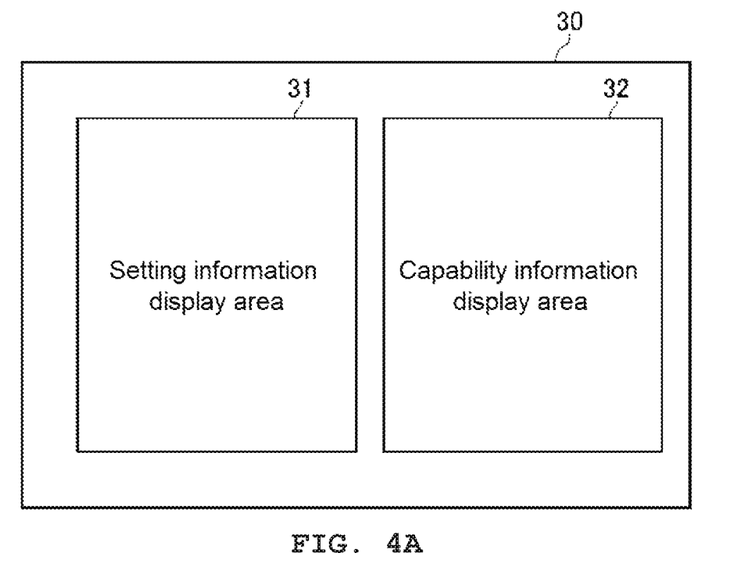
FIGS. 4A and 4B are diagrams illustrating an example of a measurement condition setting screen and a measurement result display screen that are displayed by the measurement device in an embodiment of the present invention.

FIG. 4A illustrates a measurement condition setting screen 30 for setting the measurement conditions and the like that are displayed on the display unit 19 when the user operates the operation unit 15 to set the measurement conditions and the like of the DUT 1 prior to start of the measurement. The measurement condition setting screen 30 includes a setting information display area 31 for displaying setting information of the measurement conditions and the like, and a capability information display area 32 for displaying the capability information.

Figure 4B:
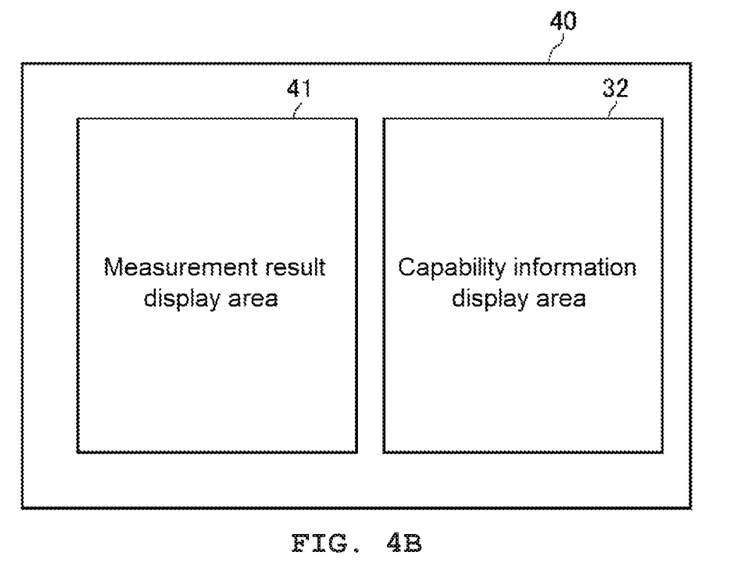

FIG. 4B illustrates a measurement result display screen 40 that is displayed on the display unit 19 in a case where the measurement is normally ended or when the measurement is interrupted due to generation of any error after the start of the measurement. The measurement result display screen 40 includes a measurement result display area 41 for displaying the measurement result, and a capability information display area 32 for displaying the capability information.

In FIGS. 4A and 4B, content displayed on the capability information display area 32 is based on the determination result of the capability determination unit 17. In a case where the capability determination unit 17 does not determine that the measurement condition set by the user is the capability excess, the capability information illustrated in FIG. 3 is displayed in the capability information display area 32. On the other hand, in a case where the capability determination unit 17 determines that the measurement condition set by the user is the capability excess, capability information illustrated in FIG. 5, for example, is displayed in the capability information display area 32. Here, the capability excess also include a case where an item not supported by the device under test is set in the measurement condition. Hereinafter, FIG. 5 will be described.

Figure 5:
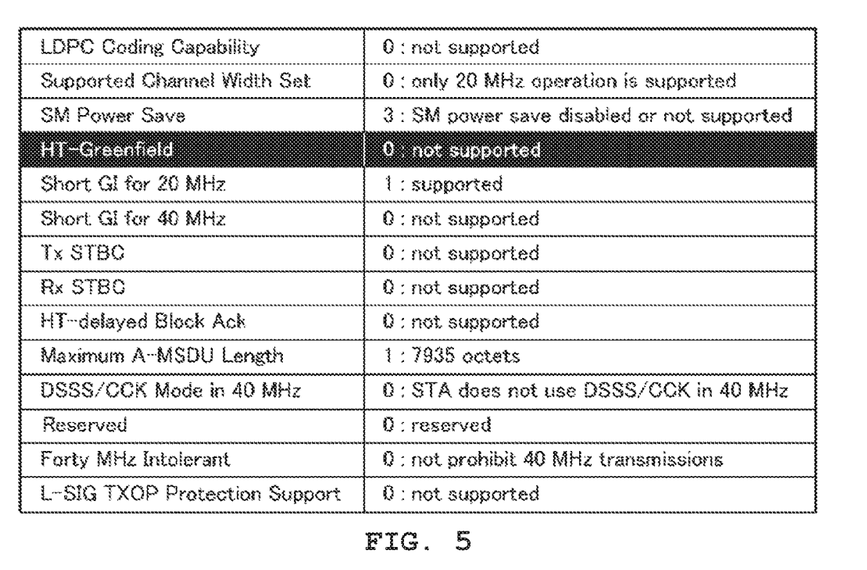
FIG. 5 is a diagram illustrating an example in which the measurement device in an embodiment of the present invention highlights and displays part of capability information.

FIG. 5 illustrates an example in which the display of the item "HT-Greenfield" and "0: not supported" in the capability information illustrated in FIG. 3 is highlighted and displayed. This highlighting display is executed on the basis of the determination result of the capability determination unit 17. For example, in a case where the user sets transmitting data to the DUT 1 in the HTGF mode as the measurement conditions for the DUT 1 in which the HTGF mode is not supported, the capability determination unit 17 determines that the measurement condition is the capability excess and notifies the display control unit 18 to the fact. The display control unit 18 highlights and displays as illustrated in FIG. 5.

Next, a specific example of the determination as to the capability excess that is performed by the capability determination unit 17 will be described with reference to with reference to FIG. 5.

The items illustrated in FIG. 5 include items in which any one of "0: not supported" or "1: supported" (not illustrated) is set, like an item "LDPC Coding Capability" and an item "HT-Greenfield". In a case where a measurement condition regarding this type of item is different from set content, the capability determination unit 17 determines that the measurement condition is capability excess. Specifically, in a case where an item "HT-Greenfield" is set to "0: not supported", when the user sets a setting condition to transmit data to the DUT 1 using the HTGF mode, the capability determination unit 17 determines that the setting condition is capability excess.

On the other hand, there are items in which "0: 3839 octets" (not illustrated) or "1: 7935 octets" can be selected like, for example, the item "Maximum A-MSDU Length" among the items illustrated in FIG. 5. In a case where the measurement conditions regarding this type of item is different from set content, the capability determination unit 17 determines that the measurement condition is capability excess. Specifically, in a case where the item "Maximum A-MSDU Length" is set to "0: 3839 octets", when the user sets measurement conditions in which a maximum length of A-MSDU exceeds 3839 octets, the capability determination unit 17 determines that the measurement condition is capability excess.

Figure 6:
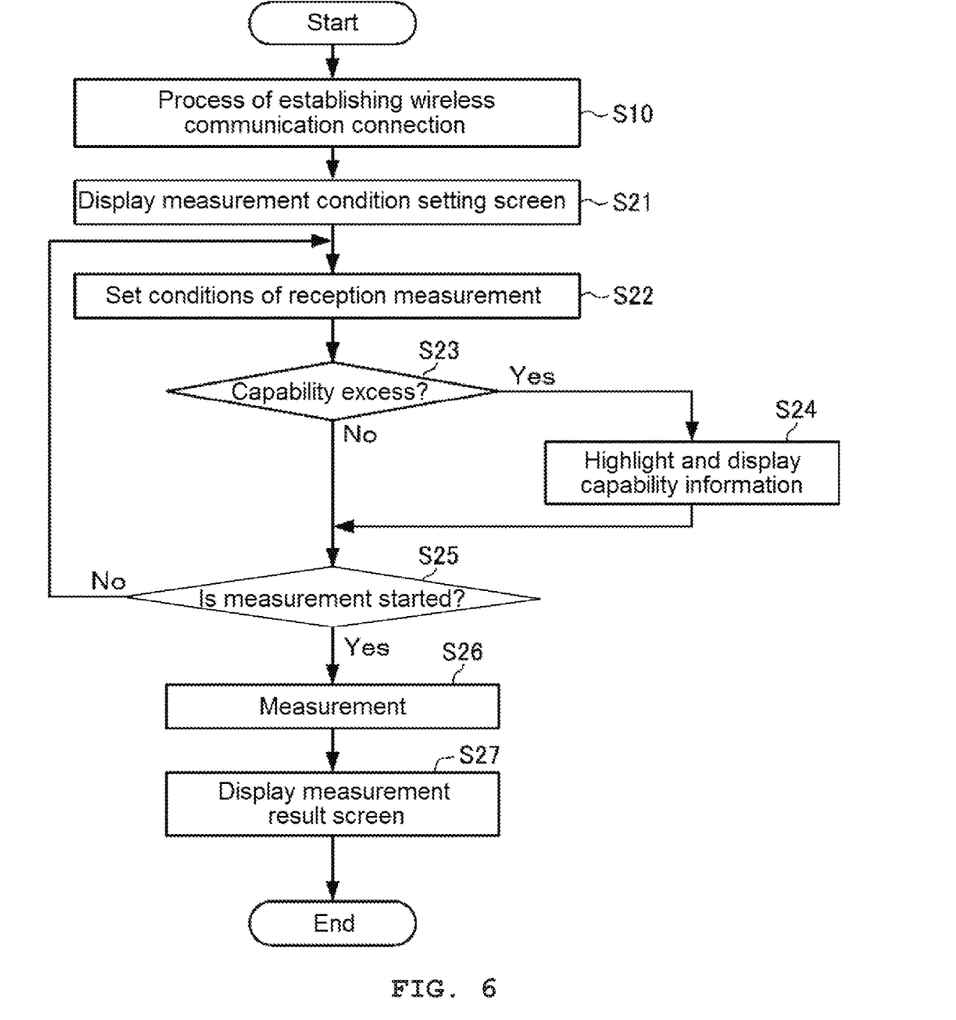
FIG. 6 is a flowchart of the measurement device in an embodiment of the present invention.

Next, an operation of the measurement device 10 in this embodiment will be described with reference to FIGS. 6 to 8. As described above, it is assumed that the measurement device 10 operates as a wireless LAN parent device (an access point), and the DUT 1 operates as a wireless LAN child device (a station).

In the following description of the operation, it is assumed that the measurement device 10 transmits predetermined data to the DUT 1 and performs reception measurement for evaluating the reception performance of the DUT 1 using the data.

Further, a case where the user has set the measurement conditions for transmission of data to the DUT 1 in the HTGF mode even though "0: not supported" (not available) is set for the item "HT-Greenfield" in the DUT 1 as illustrated in FIG. 3 will be described by way of example.

Since the measurement device 10 and the DUT 1 are connected via a wireless communication line, the transmission and reception unit 11 and the DUT 1 perform a process of establishing the wireless communication connection on the basis of the communication standard conforming to IEEE 802.11 prior to start of the measurement (step S10). This process will be described with reference to FIG. 7.

Figure 7:
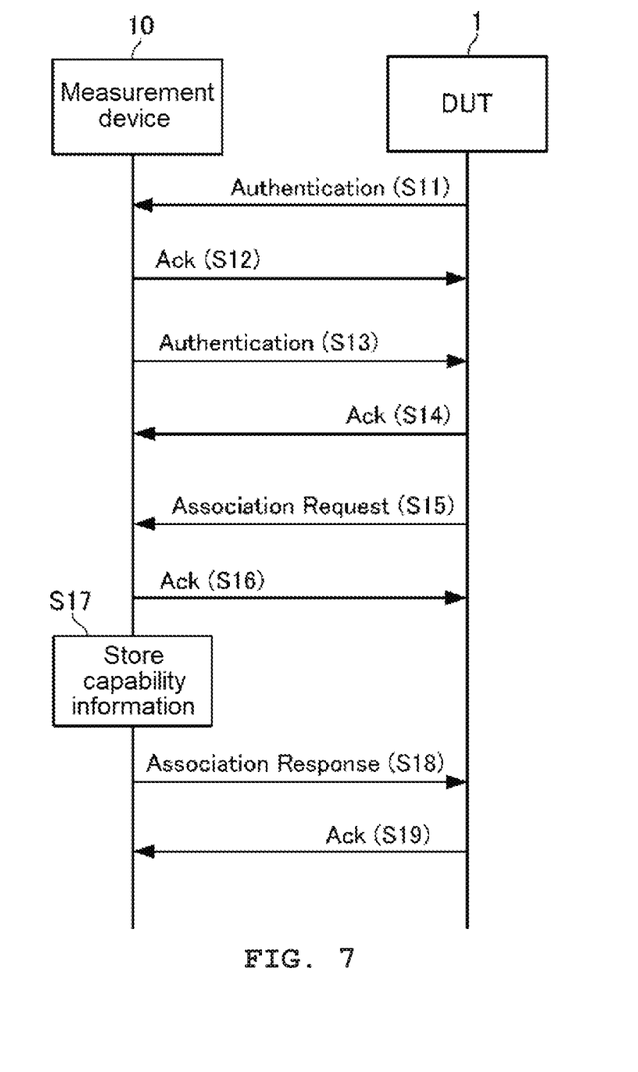
FIG. 7 is a diagram illustrating a process of establishing wireless communication connection of the measurement device in an embodiment of the present invention.

As illustrated in FIG. 7, the DUT 1 transmits an "Authentication" message to the transmission and reception unit 11 of the measurement device 10 according to an authentication scheme defined in the communication standard conforming to IEEE 802.11 (step S11).

The transmission and reception unit 11 transmits an "Ack" (Acknowledge) message to the DUT 1 in response to the "Authentication" message from the DUT 1 (step S12).

Then, the transmission and reception unit 11 transmits the "Authentication" message to the DUT 1 (step S13).

The DUT 1 transmits an "Ack" message to the transmission and reception unit 11 in response to the "Authentication" message from the transmission and reception unit 11 (step S14).

Further, in a case where the authentication is established, the DUT 1 transmits an "Association Request" message to the transmission and reception unit 11 in order to send a connection request (an association request) to the transmission and reception unit 11 (step S15). The "Association Request" message includes, for example, the capability information of each item illustrated in FIG. 2.

The transmission and reception unit 11 transmits an "Ack" message to the DUT 1 in response to the "Association Request" message from the DUT 1 (step S16).

The capability information acquisition unit 13 of the measurement device 10 extracts and acquires the capability information from the "Association Request" message, and stores the capability information in the capability information storage unit 14 (step S17). That is, in the process of establishing the wireless communication connection, the capability information acquisition unit 13 acquires the capability information of each item as illustrated in FIG. 3, for example.

Then, the transmission and reception unit 11 transmits an "Association Response" message to the DUT 1 in order to perform a connection permission response (association response) (step S18).

The DUT 1 transmits an "Ack" message to the transmission and reception unit 11 in response to the "Association Response" message from the transmission and reception unit 11 (step S19).

Through the above process, the wireless communication connection is established between the measurement device 10 and the DUT 1, and the measurement device 10 and the DUT 1 can perform transmission and reception of predetermined data through the wireless communication.

Referring back to FIG. 6, the display unit 19 displays the measurement condition setting screen 30 illustrated in FIG. 4A under the control of the display control unit 18 (step S21).

The measurement conditions and the like for reception measurement are set in the setting unit 16 by the user operating the operation unit 15 (step S22), and the setting unit 16 outputs information on the measurement conditions and the like to the transmission and reception unit 11, the capability determination unit 17, the measurement unit 12, and the display control unit 18.

The capability determination unit 17 executes the determination as to whether or not the measurement condition is the capability excess on the basis of the capability information for each item stored in the capability information storage unit 14 and the measurement condition set for a certain item (step S23).

In a case where the capability determination unit 17 determines that the measurement condition is the capability excess in step S23, the capability determination unit 17 notifies the display control unit 18 of the fact, and the display control unit 18 highlights and displays the corresponding item and the capability information displayed on the display unit 19 (step S24). As a result, the measurement device 10 in this embodiment can cause the user to reliably recognize that the setting of the measurement conditions is inappropriate.

Specifically, in a case where the user has set the measurement conditions for transmission of data to the DUT 1 in the HTGF mode even though "0: not supported" (not available) is set for the item "HT-Greenfield" in the DUT 1 as illustrated in FIG. 3, the capability determination unit 17 highlights and displays the item "HT-Greenfield" and a column "0: not supported" indicating the capability information via the display control unit 18, as illustrated in FIG.

5. In this case, the capability determination unit 17 may be configured to highlight and display any one of the column of the item "HT-Greenfield" and the column "0: not supported".

In a case where it is not determined that the measurement condition is the capability excess in step S23 or after the process of step S24, the setting unit 16 determines whether or not the measurement is started (step S25). For example, the setting unit 16 determines that the measurement is started when a predetermined key of the operation unit 15 is pressed.

In a case where it is not determined in step S25 that the measurement is started, the process returns to step S22 and the setting of the measurement conditions is subsequently performed.

On the other hand, in a case where it is determined in step S25 that the measurement is started, the measurement unit 12 performs the reception measurement (step S26).

Figure 8:
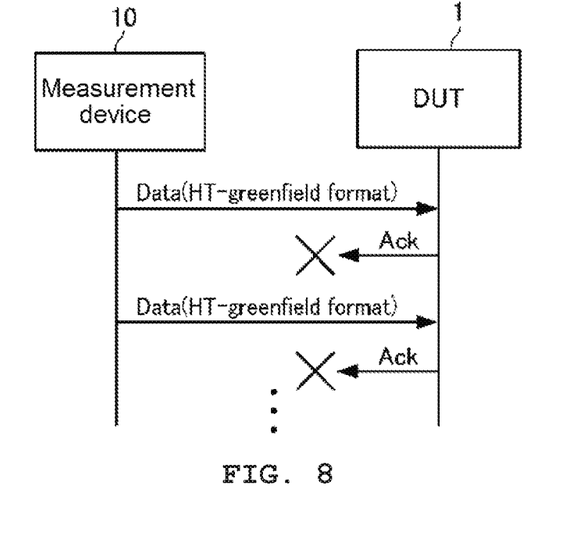
FIG. 8 is a diagram illustrating a communication state between a transmission and reception unit and a DUT in a case where measurement condition is capability excess in an embodiment of the present invention.

In this embodiment, the wireless communication between the measurement device 10 and the DUT 1 is as illustrated in FIG. 8. That is, in this embodiment, since the user sets the measurement conditions for transmission of data to the DUT 1 in the HTGF mode even though the DUT 1 is set for the HTGF mode not to be available, the Ack message is not returned from the DUT 1 no matter how many times the data of the HTGF mode is transmitted from the measurement device 10 as illustrated in FIG. 8.

As a result, the measurement unit 12 cannot perform reception measurement, and the display unit 19 displays the measurement result display screen 40 illustrated in FIG. 4B under the control of the display control unit 18 (step S27). Here, the capability information (see FIG. 5) highlighted and displayed in step S24 described above is continuously displayed in the capability information display area 32 of the measurement result display screen 40 illustrated in FIG. 4B.

As described above, since the capability determination unit 17 is configured to notify capability excess information indicating that the measurement condition exceeds the capability on condition that the measurement condition regarding the item among the measurement conditions is set to exceed the capability determined for the item in advance, the measurement device 10 according to this embodiment can notify the user of an inappropriate setting of the measurement conditions in a case where the setting of the measurement conditions is inappropriate.

Therefore, in a case where a problem in that a communication error is generated at the time of communication with the DUT 1 or an expected measurement result is not obtained is generated due to an inappropriate setting of the measurement conditions, the measurement device 10 in this embodiment can provide information contributing to investigation of causes of the problem to the user.

In the above-described embodiment, the example in which the wireless communication with the DUT 1 is performed and the DUT 1 is measured has been described, but the present invention is not limited thereto. For example, the same effects can be obtained as long as a configuration that measures the DUT through wired connection is adopted.

Further, in the above-described embodiment, the example in which the capability information acquisition unit 13 acquires the capability information when establishing the wireless communication connection with the DUT 1 has been described, but the present invention is not limited thereto and the same effects can be obtained as long as a configuration that acquires the capability information before measurement using another scheme is adopted.

INDUSTRIAL APPLICABILITY

As described above, the measurement device and the measurement method according to the present invention have an effect that it is possible to notify the user of an inappropriate setting of the measurement conditions in a case where the setting of the measurement conditions is inappropriate, and are useful as, for example, a measurement device and a measurement method of measuring a device under test using a wireless communication technology.

DESCRIPTION OF REFERENCE NUMERALS AND SIGNS

1 DUT (device under test)
10 measurement device
11 transmission and reception unit (wireless communication connection establishment means)
12 measurement unit (measurement means)
13 capability information acquisition unit (capability information acquisition means)
14 capability information storage unit
15 operation unit
16 setting unit (measurement condition setting means)
17 capability determination unit (capability excess information notification means)
18 display control unit (display control means)
19 display unit (display device)
30 measurement condition setting screen
31 setting information display area
32 capability information display area
40 measurement result display screen
41 measurement result display area

What is claimed is:

1. A measurement device including measurement condition setting means for setting measurement conditions of a device under test that performs communication on the basis of a communication standard, and measurement means for performing measurement of the device under test on the basis of the measurement conditions and outputting a result of the measurement, the measurement device comprising:
   capability information acquisition means for acquiring, from the device under test, capability information indicating capability of the device under test defined in the communication standard for each item determined in the communication standard; and
   capability excess information notification means for notifying of capability excess information indicating that the measurement condition regarding the item among the measurement conditions exceeds capability determined for each item in advance on condition that the measurement condition regarding the item among the measurement conditions has been set to exceed the capability determined for each item in advance.

2. The measurement device according to claim 1, further comprising:
   display control means for performing control to display the measurement condition and the capability information for each item side by side on a display device,
   wherein the display control means highlights and displays at least one of the item and the capability information on condition that the capability excess information has been notified from the capability excess information notification means.

3. The measurement device according to claim 1, further comprising:
wireless communication connection establishment means for establishing wireless communication connection with the device under test,
wherein the capability information acquisition means acquires the capability information for each item in a process of establishing the wireless communication connection.

4. The measurement device according to claim 3,
wherein the wireless communication connection establishment means establishes the wireless communication connection on the basis of a communication standard conforming to IEEE 802.11, and
the capability information for each item is capability information that is defined in the communication standard.

5. A measurement method including a measurement condition setting step of setting measurement conditions of a device under test that performs communication on the basis of a communication standard, and a measurement step of performing measurement of the device under test on the basis of the measurement conditions and outputting a result of the measurement, the measurement method comprising:
a capability information acquisition step of acquiring, from the device under test, capability information indicating capability of the device under test defined in the communication standard for each item determined in the communication standard; and
a capability information notification step of notifying of capability excess information indicating that the measurement condition regarding the item among the measurement conditions exceeds capability determined for each item in advance on condition that the measurement condition regarding the item among the measurement conditions has been set to exceed the capability determined for each item in advance.

6. The measurement method according to claim 5,
wherein the measurement condition and the capability information for each item are displayed side by side, and at least one of the item and the capability information is highlighted and displayed on condition that the capability excess information has been notified.

7. The measurement method according to claim 5, further comprising:
a step of executing a process of establishing wireless communication connection on the basis of the communication standard,
wherein the capability information acquisition step includes acquiring the capability information for each item in the process of establishing the wireless communication connection.

8. The measurement method according to claim 7,
wherein the step of executing the process of establishing the wireless communication connection includes establishing the wireless communication connection on the basis of a communication standard conforming to IEEE 802.11, and
the capability information for each item is capability information that is defined in the communication standard.

* * * * *